(12) United States Patent
Togashi

(10) Patent No.: US 12,279,689 B2
(45) Date of Patent: Apr. 22, 2025

(54) BAND FOR BRUSH CUTTER AND BRUSH CUTTER SET

(71) Applicant: TOHOKUSETUBI CO., LTD, Niigata (JP)

(72) Inventor: Koshichi Togashi, Niigata (JP)

(73) Assignees: TOHOKUSETUBI CO., LTD., Niigata (JP); Koshichi Togashi, Niigata (JP)

( * ) Notice: Subject to any disclaimer, the term of this patent is extended or adjusted under 35 U.S.C. 154(b) by 0 days.

(21) Appl. No.: 18/728,997

(22) PCT Filed: Dec. 23, 2022

(86) PCT No.: PCT/JP2022/047676
§ 371 (c)(1),
(2) Date: Jul. 15, 2024

(87) PCT Pub. No.: WO2023/149127
PCT Pub. Date: Aug. 10, 2023

(65) Prior Publication Data
US 2025/0009113 A1    Jan. 9, 2025

(51) Int. Cl.
*A45F 3/14*     (2006.01)
*A01D 34/90*    (2006.01)
(Continued)

(52) U.S. Cl.
CPC ............... *A45F 3/14* (2013.01); *A01D 34/90* (2013.01); *A01G 3/06* (2013.01); *A45F 5/00* (2013.01);
(Continued)

(58) Field of Classification Search
CPC ........ A45F 3/14; A45F 5/00; A45F 2003/045; A45F 2003/142; A45F 2003/144;
(Continued)

(56) References Cited

U.S. PATENT DOCUMENTS 11,357,312 B2 * 6/2022 Hasegawa ............... A01D 34/90
11,466,813 B2 * 10/2022 Zhong .................... F16M 13/04
(Continued)

FOREIGN PATENT DOCUMENTS

DE   202020002215 U1 * 8/2020 ............... A45F 3/14
DE   102024107389 A1 * 9/2024 ............... A61F 5/02
(Continued)

OTHER PUBLICATIONS

International Search Report dated Feb. 28, 2023 for PCT Application No. PCT/JP2022/047676; 6 pgs.

*Primary Examiner* — Arpad Fabian-Kovacs
(74) *Attorney, Agent, or Firm* — Ohlandt, Greeley and Perle, L.L.P.

(57) ABSTRACT

The brush cutter band has a pelvic pad, a main belt, a sub-belt, a plurality of sub-belt loops, and a suspender. The main belt is fastened to the pelvic area of a user via the pelvic pad. The sub-belt is fastened to the lower back of the user. The plurality of sub-belt loops is provided on the pelvic pad through which the sub-belt is threaded. The suspender is provided on the pelvic pad and suspendable of the brush cutter. The pelvic pad is suspended from the sub-belt by the plurality of sub-belt loops. The plurality of sub-belt loops includes corresponding sub-belt loops located above and corresponding to the suspender.

4 Claims, 8 Drawing Sheets

(51) Int. Cl.
*A01G 3/06* (2006.01)
*A45F 5/00* (2006.01)
A01D 34/82 (2006.01)
*A45F 3/04* (2006.01)

(52) U.S. Cl.
CPC .......... *A01D 34/824* (2013.01); *A01D 34/902* (2013.01); *A45F 2003/045* (2013.01); *A45F 2003/142* (2013.01); *A45F 2003/144* (2013.01); *A45F 2003/146* (2013.01); *A45F 5/1575* (2025.01); *Y10S 224/904* (2013.01)

(58) Field of Classification Search
CPC ....... A45F 2003/146; A45F 2200/0575; A01D 34/824; A01D 34/90; A01D 34/902; A01G 3/06; Y10S 224/904
See application file for complete search history.

(56) References Cited

U.S. PATENT DOCUMENTS

| | | | | |
|---|---|---|---|---|
| 2005/0092802 | A1* | 5/2005 | Maley | A45F 3/08 224/628 |
| 2005/0279797 | A1* | 12/2005 | Martin | B63H 8/56 114/39.18 |
| 2006/0108387 | A1* | 5/2006 | Nakaya | A01D 34/902 224/268 |
| 2006/0179806 | A1* | 8/2006 | Maier | A01G 3/08 30/276 |
| 2015/0053731 | A1* | 2/2015 | Ito | A45F 3/14 224/261 |
| 2016/0360868 | A1* | 12/2016 | Safe | A62B 35/0075 |
| 2019/0082814 | A1 | 3/2019 | Behringer et al. | |
| 2020/0275763 | A1* | 9/2020 | Lennings | A45F 5/00 |

FOREIGN PATENT DOCUMENTS

| | | | | |
|---|---|---|---|---|
| JP | 63-145420 | U | 6/1988 | |
| JP | 3-47008 | A | 2/1991 | |
| JP | H-10-98930 | A | 4/1998 | |
| JP | 2000217611 | A * | 8/2000 | ........... A44B 11/006 |
| JP | 2005-143453 | A | 6/2005 | |
| JP | 4369349 | B2 * | 11/2009 | ............. A01D 34/90 |
| JP | 2012-223157 | A | 11/2012 | |
| JP | 2013-102721 | A | 5/2013 | |
| JP | 3212739 | U | 9/2017 | |
| JP | 2020-80812 | A | 6/2020 | |
| WO | WO-0122847 | A1 * | 4/2001 | ............... A45F 3/10 |
| WO | WO-2008076009 | A1 * | 6/2008 | ............... A45F 3/14 |
| WO | WO-2008076010 | A1 * | 6/2008 | ............... A45F 3/14 |
| WO | WO-2020110303 | A1 * | 6/2020 | ........... A01D 34/902 |

* cited by examiner

BAND FOR BRUSH CUTTER AND BRUSH CUTTER SET

TECHNICAL FIELD

The present disclosure relates to a brush cutter band for suspending a brush cutter and a brush cutter set equipped with the brush cutter band.

BACKGROUND ART

For example, Patent Literature 1 describes a lower back belt worn by a user of a brush cutter to suspend the brush cutter. The lower back belt described in Patent Literature 1 comprises a rope member that is wrapped around the lower back of the user and stretched along the lower back belt, and an engagement member that can be moved along the rope member. By being attached to this engagement member, the brush cutter suspended from the lower back belt is positioned near the right lower back of the user. Patent Literature 1 proposes a method of supporting a brush cutter only by means of the lower back belt, without using a shoulder belt that is hung on the shoulder of a user.

CITATION LIST

Patent Literature

Patent Literature 1: Japanese Patent No. 6642648

SUMMARY OF INVENTION

Technical Problem

The lower back belt described in Patent Literature 1 has a structure that supports the vertical load of the brush cutter only by the tightening force of the lower back belt that is applied in a generally horizontal direction. Therefore, with this lower back belt, the load of the brush cutter is concentrated directly on one side of the lower back belt (that is, the right lower back of the user). The user wearing this lower back belt has to do mowing work while bearing the load concentrated on the right lower back. In addition, this lower back belt is expected to slip down on one side where the brush cutter is suspended. Considering the above, even if this lower back belt structure can free the user from the hassle of the shoulder belt, the lower back belt structure cannot reduce the burden on the user caused by the load of the brush cutter, making it questionable from the viewpoint of practicality.

The present disclosure has been devised in view of the above situation. An objective of the present disclosure is to provide a brush cutter band and a brush cutter set that can eliminate the shoulder belt and reduce the burden on the user.

Solution to Problem

In order to achieve the above-mentioned objective, the brush cutter band according to a first aspect of the present disclosure is a brush cutter band to be worn by a user of a brush cutter and used to suspend the brush cutter, comprising:
  a pelvic pad to be wrapped around the pelvic area of the user;
  a main belt to be wrapped around the pelvic pad and fastened over the pelvic area through the pelvic pad;
  a sub-belt to be fastened around a lower back of the user;
  a plurality of sub-belt loops provided on the pelvic pad and to be threaded with the sub-belt; and
  a suspender provided on the pelvic pad and suspendable of the brush cutter,
wherein
  the pelvic pad is suspended from the sub-belt by the plurality of sub-belt loops, and
  the plurality of sub-belt loops includes a corresponding sub-belt loop located above and corresponding to the suspender.

The suspender may include a left suspender to be located on the left leg of the user in a worn state where the brush cutter band is worn by the user and a right suspender to be located on the right leg of the user in the worn state, and
  in a case where the brush cutter is suspended from one of the left suspender and the right suspender, the other can be used to suspend a pad plate that is applied to at least one of a knee and a thigh of the user.

The left suspender may include a first left anchor and a second left anchor that are spaced from each other in the longitudinal direction of the pelvic pad and capable of tethering a suspension material,
  the first left anchor may be located more forward for the user than the second left anchor in the worn state,
  the right suspender may include a first right anchor and a second right anchor that are spaced from each other in the longitudinal direction of the pelvic pad and capable of tethering a suspension material,
  the first right anchor may be located more forward for the user than the second right anchor in the worn state,
  in a case where the brush cutter is suspended from the left suspender and the pad plate is suspended from the right suspender, the left suspender may suspend the brush cutter via a suspension material tethered to the first left anchor and the second left anchor, and the right suspender may suspend the pad plate via a suspension material tethered to the first right anchor, and
  in a case where the brush cutter is suspended from the right suspender and the pad plate is suspended from the left suspender, the right suspender may suspend the brush cutter via a suspension material tethered to the first right anchor and the second right anchor, and the left suspender may suspend the pad plate via a suspension material tethered to the first left anchor.

There may be at least four of the corresponding sub-belt loop, corresponding to each of the first left anchor, the second left anchor, the first right anchor, and the second right anchor.

The pelvic pad may further comprise a plurality of main belt loops provided on the pelvic pad and threaded with the main belt, and
  the plurality of main belt loops may include a corresponding main belt loop located below and corresponding to the corresponding sub-belt loop.

In order to achieve the above-mentioned objective, the brush cutter set according to a second aspect of the present disclosure is a brush cutter set including the brush cutter band, the brush cutter, and a brush cutter handle to be attached to the brush cutter, wherein
  the brush cutter comprises:
    a shaft extending in the front-back direction of the user;
    a rotary blade located at the front end of the shaft; and
    a prime mover located at the rear end of the shaft and configured to rotate the rotary blade, the brush cutter handle comprises:
- a bar intersecting the shaft and extending in the left-right direction as seen from the user;
- a left grip located on the left side of the bar as seen from the user and to be held by the left hand of the user; and
- a right grip located on the right side of the bar as seen from the user and to be held by the right hand of the user, the bar has an attached portion intersecting the shaft and to be attached to the shaft, in a first case where the rotary blade of the brush cutter rotates counterclockwise as seen from the user, the attached portion is set at a position biased to the left as seen from the user from the center of the bar in the left-right direction, and a portion of the bar to the right as seen from the user from the attached portion is set as a pressed portion to be pressed by a leg of the user, in a second case where the rotary blade of the brush cutter rotates clockwise as seen from the user, the attached portion is set at a position biased to the right as seen from the user from the center of the bar in the left-right direction, and a portion of the bar to the left as seen from the user from the attached portion is set as a pressed portion to be pressed by the leg of the user, and the brush cutter handle positions the brush cutter to the left of the user in the first case and positions the brush cutter to the right of the user in the second case.

Advantageous Effects of Invention

According to the present disclosure, a shoulder belt can be eliminated, and a burden on a user can be reduced.

BRIEF DESCRIPTION OF DRAWINGS

FIG. 5A is a schematic side view of the attachment and FIG. 5B is a schematic plan view of the attachment;

DESCRIPTION OF EMBODIMENTS

An embodiment of the present disclosure is described with reference to the drawings.

Figure 1:
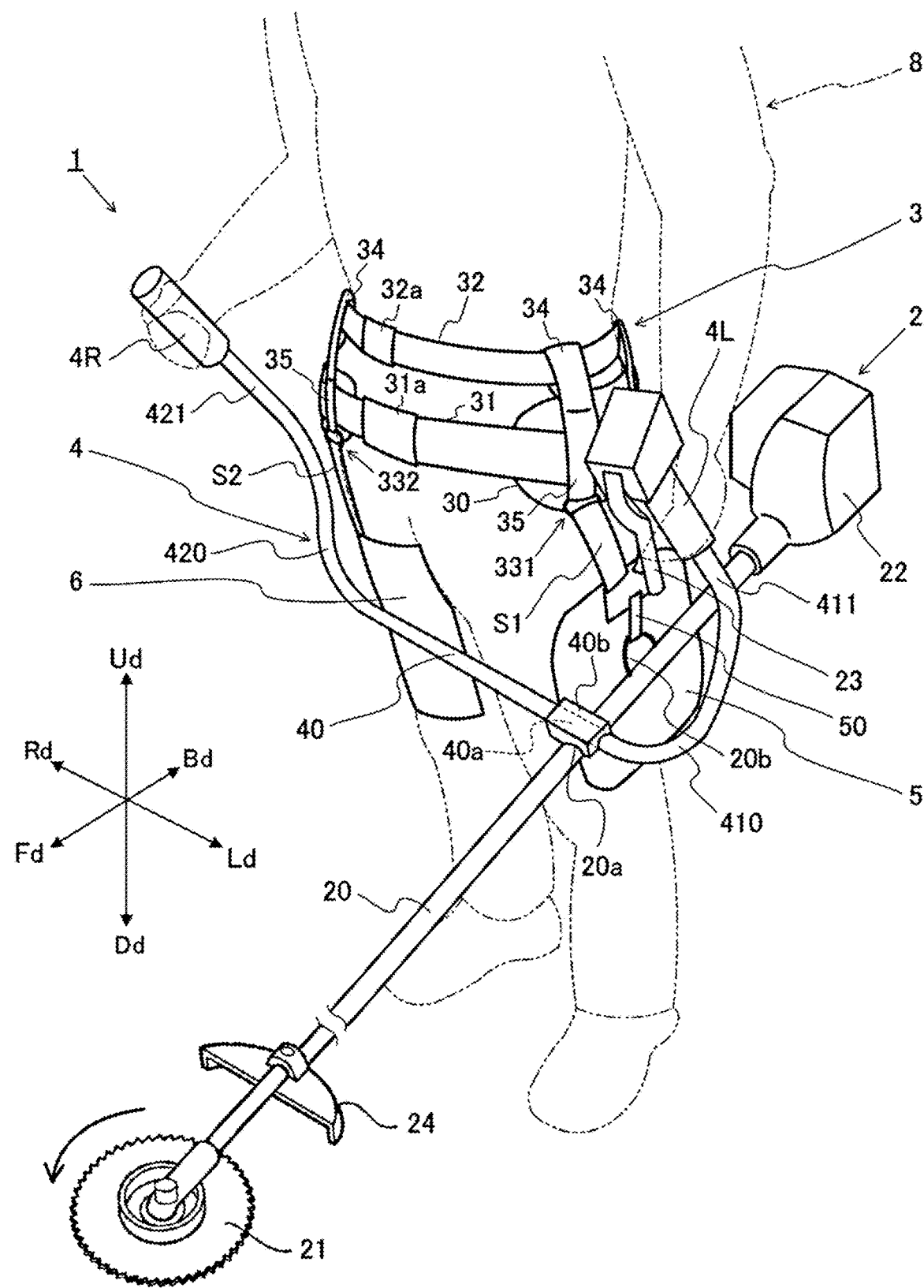
FIG. 1 is a perspective diagram of a brush cutter set according to an embodiment of the present disclosure.
Figure 5A:
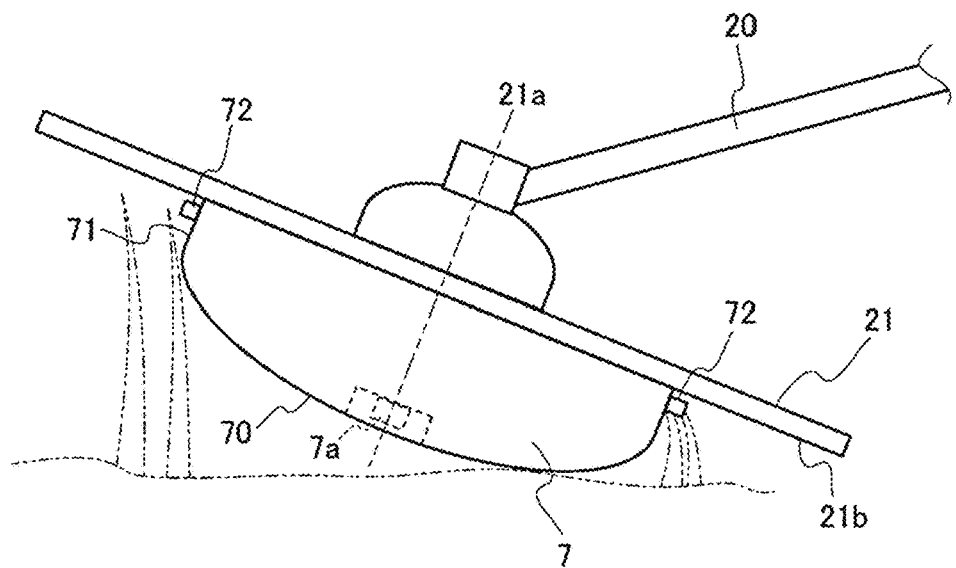
FIGS. 5A and 5B are diagrams for illustrating the action of attachment according to the same embodiment.
Figure 5B:
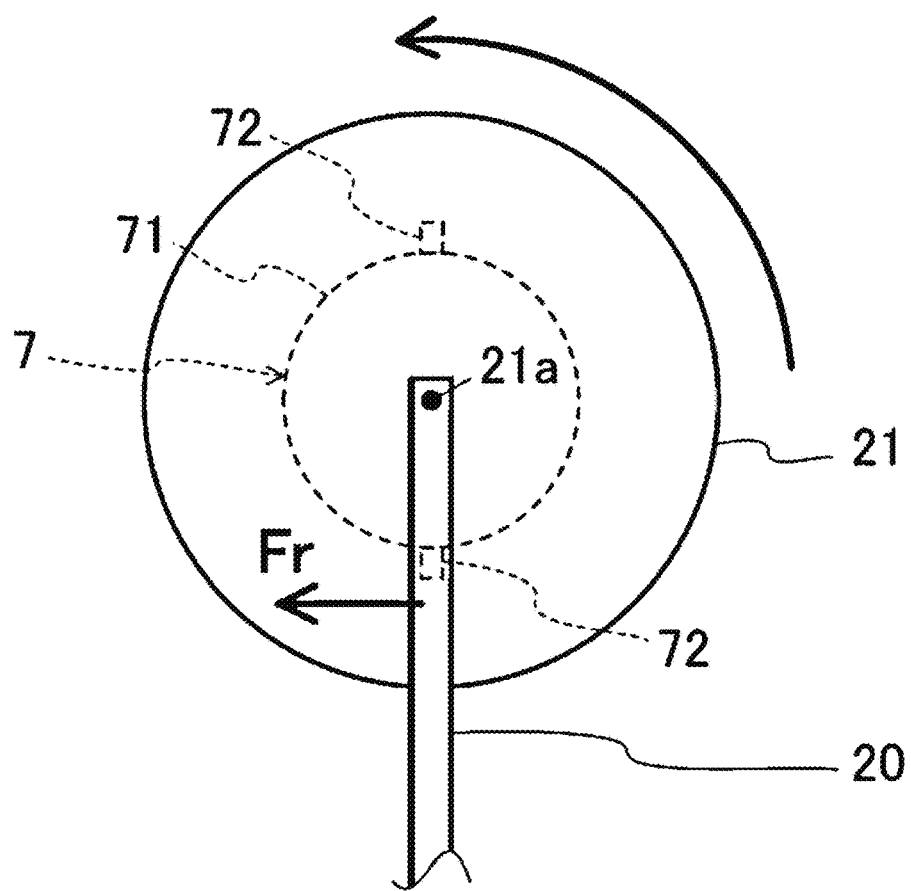

A brush cutter set 1 includes a brush cutter 2, a brush cutter band 3, a brush cutter handle 4, a buffer plate 5, and a pad plate 6, as illustrated in FIG. 1. The brush cutter set 1 further includes an attachment 7, as illustrated in FIGS. 5A and 5B.

Brush Cutter 2

The brush cutter 2 includes a shaft 20, a rotary blade 21, a prime mover 22, a throttle 23, and a scattering protection cover 24.

Figure 4:
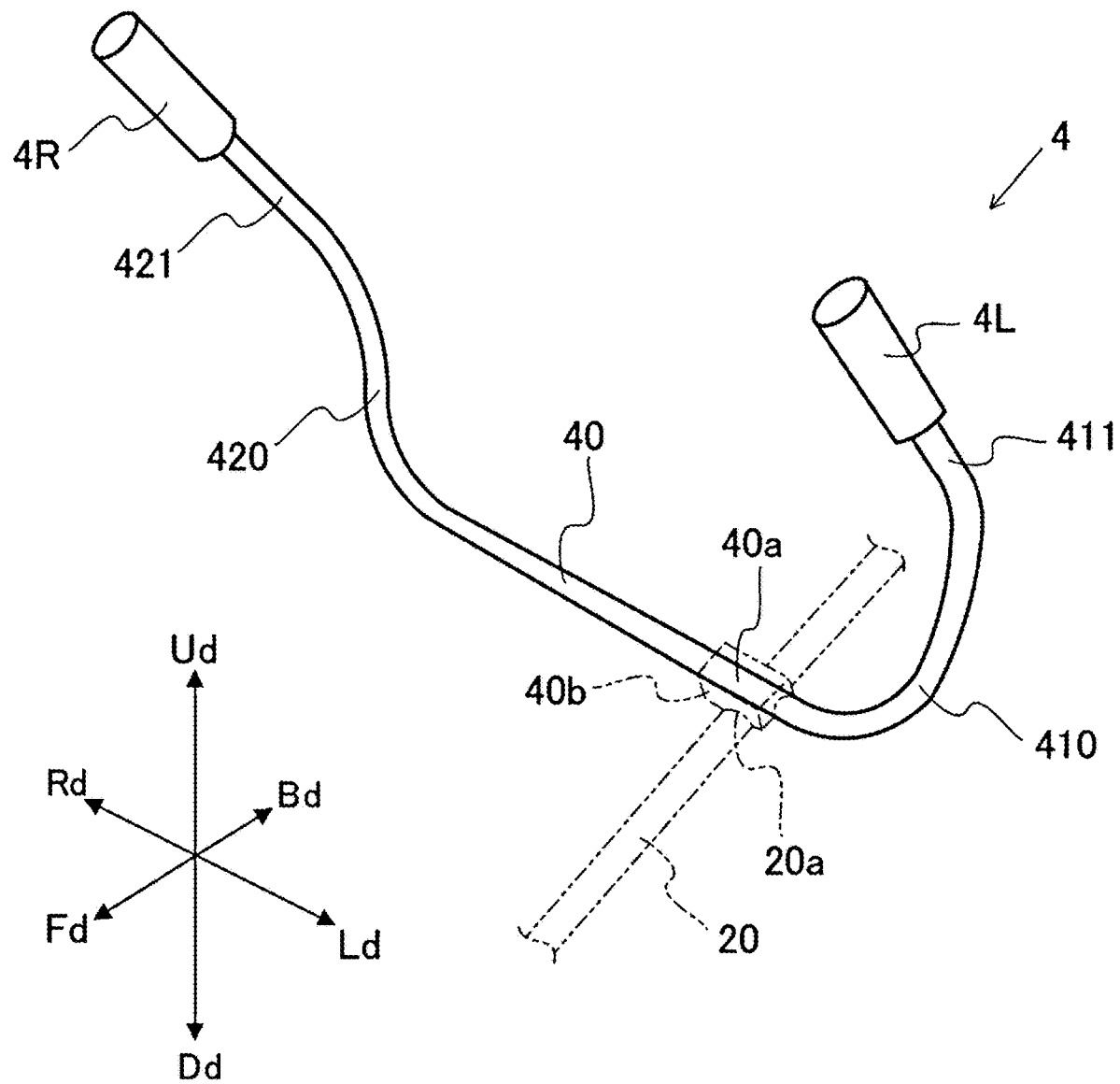
FIG. 4 is a schematic diagram of a handle for a brush cutter according to the same embodiment.

A user 8 of the brush cutter 2 operates the brush cutter 2 to mow grass, small trees, and/or the like. In FIGS. 1 and 4, directions for the user 8 are indicated as front Fd, back Bd, left Ld, right Rd, up Ud, and down Dd (the same applies to FIG. 8 below). The directions front, back, left, right, up, and down used in the following description refer to the directions for user 8 unless otherwise noted.

The shaft 20 extends in the front-back direction of the user 8 of the brush cutter 2. The shaft 20 is a pipe-shaped member, inside of which is a rotary shaft (not illustrated) for rotating the rotary blade 21 in response to the power of the prime mover 22. A position closer to the prime mover 22 than the center of the shaft 20 in the longitudinal direction is set as a handle attachment position 20a where the brush cutter handle 4 is mounted. The shaft 20 has a hanger 20b closer to the prime mover 22 than the handle attachment position 20a where the hanger 20b is a portion to be suspended from the brush cutter band 3 in a manner described below. The hanger 20b is, for example, a ring-shaped member fixed to the shaft 20.

The rotary blade 21 is located at the front end of the shaft 20. The rotary blade 21 is a circular saw having the shape of a disk, for example, a chip saw. The rotary blade 21 in the present embodiment rotates counterclockwise as seen from the user 8. Hereinafter, the object that can be cut by the rotary blade 21 is referred to as "grass and/or the like." The grass and/or the like is not limited to grass, but includes small trees, branches, and/or the like.

The prime mover 22 is located at the rear end of the shaft 20 and rotates the rotary blade 21. The prime mover 22 includes an engine or motor and rotates the rotary blade 21 via a rotary shaft provided inside the shaft 20.

The throttle 23 is used by the user 8 to operate the prime mover 22 and is attached to the brush cutter handle 4. In the present embodiment, the throttle 23 is attached to a left grip 4L, described below, of the brush cutter handle 4. The throttle 23 is electrically connected to the prime mover 22 by a throttle wire that is not illustrated. By holding the throttle 23, the user 8 operates the rotary motion of the rotary blade 21 through the prime mover 22.

The scattering protection cover 24 is a member to protect the user 8 from scattering of grass and/or the like cut by the rotary blade 21. The scattering protection cover 24 is detachable from the shaft 20 and is mounted near the rotary blade 21.

Brush Cutter Band 3

Figure 2:
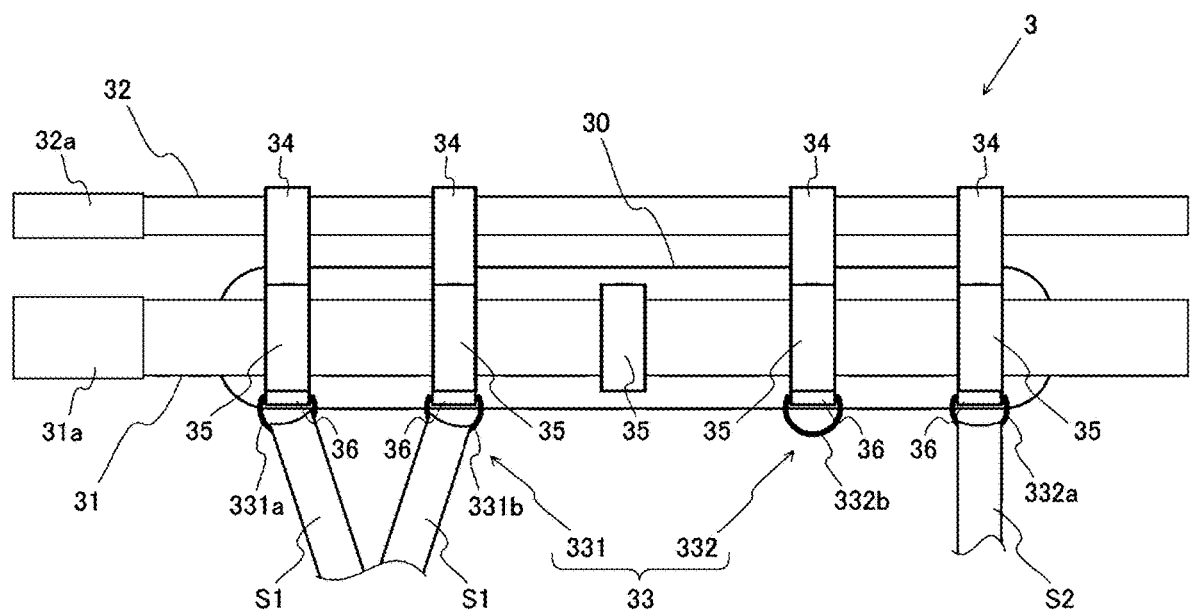
FIG. 2 is a schematic development diagram of the brush cutter band according to the same embodiment.
Figure 3:
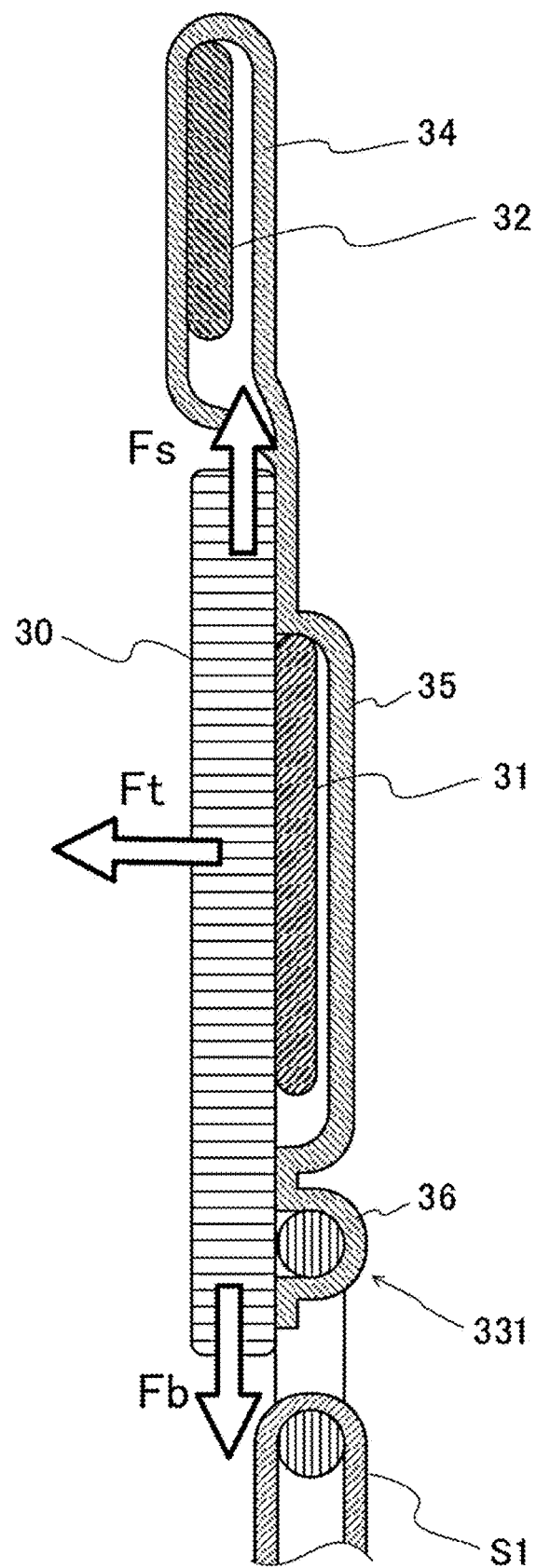
FIG. 3 is a partial cross-sectional view of the brush cutter band according to the same embodiment, illustrating the force acting on the pelvic pad.

The brush cutter band 3 is a structure for suspending the brush cutter 2 and is worn by the user 8. As illustrated in FIGS. 1 to 3, the brush cutter band 3 includes a pelvic pad 30, a main belt 31, a sub-belt 32, a suspender 33, a plurality of sub-belt loops 34, and a plurality of main belt loops 35.

The pelvic pad 30 is a strip of cushioning material to be wrapped around the pelvic area of the user 8. The pelvic area here is generally the same as the buttocks of the user 8.

The main belt 31 is wrapped around the pelvic pad 30 and fastened through the pelvic pad 30 to the pelvic area of the user 8. The main belt 31 is threaded through a plurality of main belt loops 35 provided on the pelvic pad 30, as illustrated in FIG. 2. The width of the main belt 31 is narrower than the width of the pelvic pad 30. At one end in the longitudinal direction of the main belt 31 is provided a clasp 31a for tightening the main belt 31 to the pelvic area of the user 8. The clasp 31a may be a known buckle, hook and loop fastener, or the like. The main belt 31 may be provided with an adjuster, not illustrated, to adjust the length. The user 8 attaches the pelvic pad 30 to the pelvic area of the user 8 by tightening the main belt 31 with the clasp 31a. The pelvic pad 30 distributes the tightening force of the main belt 31 over the pelvic area of the user 8, thereby reducing the burden on the user 8.

The sub-belt 32 is fastened around the lower back of the user 8. The sub-belt 32 is threaded through a plurality of sub-belt loops 34 toward the top of the pelvic pad 30 as illustrated in FIG. 2. The width of sub-belt 32 is set to be narrower than the width of the main belt 31 in the present embodiment, but is not limited to this and can be set arbitrarily. At one end in the longitudinal direction of the sub-belt 32, a clasp 32a is provided to tighten the sub-belt 32 to the lower back of the user 8. The clasp 32a may be a known buckle, hook and loop fastener, or the like. The sub-belt 32 may be provided with an adjuster, not illustrated, for adjusting the length. The user 8 tightens the sub-belt 32 around the lower back of the user 8 using the clasp 32a.

The suspender 33 is a portion provided on the pelvic pad 30 from which the brush cutter 2 can be suspended. The suspender 33 includes a left suspender 331 that is positioned on the left leg of the user 8 in a state where the brush cutter band 3 is worn by the user 8 (hereinafter referred to as "worn state") and a right suspender 332 that is positioned on the right leg of the user 8 in the worn state.

The left suspender 331 includes a first left anchor 331a and a second left anchor 331b to which a suspension material including, for example, a strap can be tethered. Hereinafter, the suspension material that can be tethered to the left suspender 331 is referred to as the left suspension material S1. The first left anchor 331a and the second left anchor 331b are spaced apart from each other in the longitudinal direction of the pelvic pad 30. The first left anchor 331a is positioned more forward for the user 8 than the second left anchor 331b in the worn state. Each of the first left anchor 331a and the second left anchor 331b consists of, for example, a D-shaped ring that is threaded through and supported by a support loop 36 provided at the lower end of the pelvic pad 30.

The right suspender 332 includes a first right anchor 332a and a second right anchor 332b to which a suspension material including, for example, a strap can be tethered. Hereinafter, the suspension material that can be tethered to the right suspender 332 is referred to as the right suspension material S2. The first right anchor 332a and the second right anchor 332b are spaced apart from each other in the longitudinal direction of the pelvic pad 30. The first right anchor 332a is more forward for the user 8 than the second right anchor 332b in the worn state. Each of the first right anchor 332a and the second right anchor 332b consists of, for example, a D-shaped ring that is threaded through and supported by a support loop 36 provided at the lower end of the pelvic pad 30.

Note that each of the left suspension material S1 and the right suspension material S2 can be adjusted in length by an adjuster not illustrated. Each of the left suspension material S1 and the right suspension material S2 is arbitrary, not limited to a strap, as long as a target object can be hung. Each of the left suspension material S1 and the right suspension material S2 may be a chain, wire, rope, or the like.

Here, in the present embodiment where the rotary blade 21 rotates counterclockwise as seen from the user 8, the brush cutter 2 is suspended from the left suspender 331. As illustrated in FIG. 2, a left suspension material S1 is tethered to each of the first left anchor 331a and the second left anchor 331b of the left suspender 331. The left suspender 331 suspends the brush cutter 2 via the left suspension material S1. Specifically, the left suspension material S1 tethered to each of the first left anchor 331a and the second left anchor 331b is V-shaped, and the lower end is coupled to the buffer plate 5, as illustrated in FIG. 1.

The buffer plate 5 coupled to the left suspension material S1 is used to be positioned between the side of the left thigh of the user 8 and the shaft 20 of the brush cutter 2, as illustrated in FIG. 1. The buffer plate 5 can prevent the shaft 20 from directly hitting the leg of the user 8, thus reducing the burden on the user 8 during the mowing work. The buffer plate 5 is provided with a latch 50 that is latched on the hanger 20b of the shaft 20. The latch 50 may be, for example, a hook, a carabiner, or the like, and the material is arbitrary as long as the latch 50 can be latched on the hanger 20b. As described above, in the present embodiment, the left suspender 331 suspends the brush cutter 2 via the left suspension material S1 and the buffer plate 5.

In the present embodiment where the rotary blade 21 rotates counterclockwise as seen from the user 8, the pad plate 6 is suspended from the right suspender 332. As illustrated in FIG. 2, the right suspension material S2 is tethered to the first right anchor 332a of the right suspender 332. The right suspender 332 suspends the pad plate 6 via the right suspension material S2. Specifically, the right suspension material S2 tethered to the first right anchor 332a is coupled at the lower end to the pad plate 6, as illustrated in FIG. 1.

The pad plate 6 coupled to the right suspension material S2 is used to be
positioned between the front surface of the right thigh of the user 8 and the brush cutter handle 4, as illustrated in FIG. 1. The pad plate 6 prevents the brush cutter handle 4 from directly hitting the leg of the user, thus reducing the burden on the user 8 during the brush cutter work. Furthermore, when the brush cutter handle 4 is pushed out with the right leg, as described below, the pad plate 6 can effectively apply force to the brush cutter handle 4. The pad plate 6 is made from resin, for example, and is a plate material curved to fit a thigh of a user 8.

The pad plate 6 may be shaped to be applied to at least one of the knees and thighs of the user 8. The pad plate 6 may have a grid or mesh shape, or may have lightening holes to reduce weight.

The sub-belt loops 34 of the present embodiment are correspondingly provided above the first left anchor 331a, second left anchor 331b, first right anchor 332a, and second right anchor 332b, as illustrated in FIG. 2. In other words, the pelvic pad 30 of the present embodiment has four sub-belt loops 34.

Five main belt loops 35 of the present embodiment are provided on the pelvic pad 30, as illustrated in FIG. 2. Four of these main belt loops 35 are correspondingly provided above the first left anchor 331a, second left anchor 331b, first right anchor 332a, and second right anchor 332b, as illustrated in FIG. 2. The remaining one main belt loop 35 is provided at the center in the longitudinal direction of the pelvic pad 30 and is positioned near the spine of the user 8 in the worn state.

In the present embodiment where the brush cutter 2 is suspended from the left suspender 331, two sub-belt loops 34 located above and corresponding to the left suspender 331 (that is, the sub-belt loop 34 corresponding to the first left anchor 331a and the sub-belt loop 34 corresponding to the second left anchor 331b) serve as the corresponding sub-belt loops. The main belt loop 35 corresponding to the first left anchor 331a and the main belt loop 35 corresponding to the second left anchor 331b serve as the corresponding main belt loops located below and corresponding to the corresponding sub-belt loops.

In the present embodiment, the set of support loops 36, main belt loops 35, and sub-belt loops 34 provided along the shorter direction of the pelvic pad 30, corresponding to the first left anchor 331a, are integrally configured as a synthetic fiber brush cutter band. Specifically, by sewing this brush cutter band to the pelvic pad 30, the support loops 36, main belt loops 35, and sub-belt loops 34 that are provided corresponding to the first left anchor 331a are configured to perform their respective functions. Note that the set of support loops 36, main belt loops 35 and sub-belt loops 34 provided corresponding to the second left anchor 331b, first right anchor 332a and second right anchor 332b are similarly integrally configured as a synthetic fiber brush cutter band. This reduces the number of parts and simplifies manufacturing, while effectively demonstrating the effect of the brush cutter band for the brush cutter 3 described below. Note that one main belt loop 35 that is positioned near the spine of the user 8 in the worn state, is made by sewing a synthetic fiber brush cutter band to the pelvic pad 30.

The effect of the above configuration of the brush cutter band 3 is described next with reference to FIG. 3.

Effect of Brush Cutter Band 3

FIG. 3 illustrates a schematic cross-sectional diagram of the left suspender 331 of the brush cutter band 3, along the shorter direction. The pelvic pad 30 receives the load Fb of the brush cutter 2 working downward as the brush cutter 2 is suspended from the left suspender 331. When the user 8 tightens the main belt 31 to the pelvic area of the user 8, the tightening force Ft by the main belt 31 acts on the pelvic pad 30 in a generally horizontal direction. When the user 8 tightens the sub-belt 32 to the lower back of the user 8, the pelvic pad 30 is suspended against the sub-belt 32 by the sub-belt loops 34. As a result, the tension Fs by the sub-belt loops 34 works upward on the pelvic pad 30.

Considering the above, the pelvic pad 30 can offset (support) the load Fb working downward with the composite vector of the tightening force Ft and tension Fs. This action allows the brush cutter band 3 to distribute the force acting on the user 8 via the pelvic pad 30, thereby reducing the burden on the user 8. If the load Fb were to be supported only by the tightening force Ft by the main belt 31 while preventing the main belt 31 from slipping down, the tightening force Ft would have to be very large to create an upward component of the force vector, making it unrealistic. However, according to the brush cutter band 3 of the present embodiment, the pelvic pad 30 can reduce the burden on the user 8 as described above by creating a state where the pelvic pad 30 is suspended by the sub-belt 32.

Furthermore, the sub-belt loops 34 are located above the left suspender 331 where the brush cutter 2 is suspended. These sub-belt loops 34 serve as the corresponding sub-belt loops corresponding to the left suspender 331. The corresponding sub-belt loops prevent the pelvic pad 30 from slipping off at the point where the load Fb of the brush cutter 2 is applied (the left side of the user 8 in the present embodiment).

In practice, the user 8 performs mowing work while turning the brush cutter 2 in an arc from side to side, exerting a twisting force on the pelvic pad 30. In the brush cutter band 3 of the present embodiment, the sub-belt loops 34 are spaced apart in the longitudinal direction of the pelvic pad 30 (that is, in the circumferential direction of the pelvic area of the user 8 in the worn state), so the tension Fs acting on the pelvic pad 30 via the plurality of sub-belt loops 34 is three-dimensional. As a result, the load Fb of the brush cutter 2 applied to the user 8 via the pelvic pad 30 can be stably supported by the three-dimensional vector force.

According to the above-described brush cutter band 3, the brush cutter 2 can be stably suspended without a shoulder belt to be hung on the shoulder of the user 8.

According to the brush cutter band 3, the upper body of the user 8 can be released since a shoulder belt can be omitted, and mobility and breathability of the upper body can be ensured. As a result, the burden on the user 8 can be reduced.

Difference From Safety Harness for Electrical Work

Here, it should be clarified that there is a safety harness used by electricians when working on poles, similar to yet different from the brush cutter band 3 in the present embodiment, but the configuration and functions of this safety harness and the brush cutter band 3 are completely different.

This safety harness includes a pad to be wrapped around the pelvic area of a lineman and a safety belt to be wrapped around the pad. The safety harness can be coupled to an auxiliary belt to be wrapped around the lower back of the lineman. This auxiliary belt always suspends the safety belt and never the pad in order to prevent the lineman from slipping out of the safety harness and falling. The configuration and function of the brush cutter band 3 according to the present embodiment is completely different from the safety harness used by electricians, because the sub-belt loops 34 through which the sub-belt 32 is threaded do not suspend the main belt 31 but the pelvic pad 30 to which the load Fb of the brush cutter 2 is applied.

Furthermore, the auxiliary belt for hanging the safety harness, securing the position of the worker when working on a pole and at the same time serving as a seat, must suspend the safety belt equally on the front, back, left, and right sides. On the other hand, in the brush cutter band 3, the sub-belt 32 does not necessarily suspend the pelvic pad 30 equally in the front, back, left, and right. The brush cutter band 3 should at least be configured so that the sub-belt 32 suspends the pelvic pad 30 via sub-belt loops 34 provided at positions corresponding to the suspender 33 from which the brush cutter 2 can be suspended. There is another significant difference between the two in this respect.

Brush Cutter Handle 4

As illustrated in FIGS. 1 and 4, the brush cutter handle 4 has a bar 40, a left curve 410, a left bend 411, a right curve 420, and a right bend 421.

The bar 40, left curve 410, left bend 411, right curve 420, and right bend 421 are integrally configured as a pipe member made of, for example, stainless steel or aluminum.

The bar 40 intersects the shaft 20 of the brush cutter 2 and extends in a left-right direction as seen from the user 8. The bar 40 of the present embodiment extends in a straight line. The bar 40 has an attached portion 40a that intersects the shaft 20 and is attached to the shaft 20. Specifically, the attached portion 40a is attached to the shaft 20 by a coupling material 40b. As the coupling material 40b, for example, a pipe connecting clamp can be used, but any configuration can be used, not limiting to the clamp, as long as the bar 40 and the shaft 20 can be coupled. In the present embodiment, the brush cutter handle 4 is attached to the shaft 20 so that the bar 40 is orthogonal to the shaft 20. The bar 40 and shaft 20 do not necessarily have to be orthogonal to each other, but may be slightly tilted (for example, a few degrees) relative to the orthogonal relationship, as long as the ease of handling of the brush cutter 2 for the user 8 is not interfered.

The left curve 410 is continuous with the left end of the bar 40 as seen from the user 8, and is curved and extends toward the upper part of the user 8. Specifically, the left curve 410 has a shape that extends from the left end of the bar 40, curving and heading further to the left, diagonally upward behind the user 8.

The left bend 411 is continuous with the upper end of the left curve 410 and bends and extends toward the front of the user 8. The left bend 411 is provided with a left grip 4L to be held by the left hand of the user 8.

The left grip 4L is, for example, a member attached to the upper end portion of the left bend 411 and made of rubber, sponge, or other resin material. Note that the left grip 4L is not limited to a member attached to the left bend 411, but may be a portion of the left bend 411 that is held by the left hand of the user 8.

The right curve 420 is continuous with the right end of the bar 40 as seen from the user 8, and is curved and extends toward the upper part of the user 8. Specifically, the right curve 420 has a shape that extends from the right end of the bar 40, curving and heading further to the right, diagonally upward behind the user 8.

The right bend 421 is continuous with the upper end of the right curve 420 and bends and extends toward the front of the user 8. The right bend 421 is provided with a right grip 4R to be held by the right hand of the user 8.

The right grip 4R is, for example, a member attached to the upper end portion of the right bend 421 and made of rubber, sponge, or other resin material. Note that the right grip 4R is not limited to a member attached to the right bend 421, but may be a portion of the right bend 421 that is held by the right hand of the user 8.

In the present embodiment where the rotary blade 21 rotates counterclockwise as seen from the user 8, the attached portion 40a is set at a position that is biased toward the left curve 410 rather than the center of the bar 40 in the left-right direction. In the brush cutter handle 4 with the attached portion 40a attached to the handle attachment position 20a of the shaft 20, the portion between the attached portion 40a and the right curve 420 in the bar 40 is set as a "pressed portion" to be pressed by the leg of the user 8. The brush cutter handle 4 of the present embodiment positions the brush cutter 2 to the left of the user 8.

In a state where the brush cutter 2 is properly suspended from the brush cutter band 3, the portion between the attached portion 40a and the right curve 420 (the above-described pressed portion) in the bar 40 is located in front of both legs of the user 8, as illustrated in FIG. 1. The pressed portion is preferably set at the height of the knee or thigh of the user 8.

When the bar 40 of the brush cutter handle 4 is positioned as described above, the left curve 410 is positioned along and spaced from the thigh of the left leg of the user 8. Then, the left bend 411 is tilted forward from the upper end of the left curve 410. Similarly, the right curve 420 is positioned along and spaced apart from the thigh of the right leg of the user 8. Then, the right bend 421 is tilted forward from the upper end of the right curve 420.

The left side portion (that is, the left curve 410 and the left bend 411) and the right side portion (that is, the right curve 420 and the right bend 421) of the brush cutter handle 4 are configured so that the distance (a left-right directional distance) between the left side portion and the right side portion widens slightly as the left side portion and the right side portion move away from the bar 40.

The brush cutter handle 4 configured as described above allows the user 8 to hold the left grip 4L and the right grip 4R with the left and right hands with (i) the left and right sides slightly open, (ii) the left and right upper arms hanging naturally, and (iii) the left and right elbows slightly bent. This allows the user 8 to hold the brush cutter handle 4 in a posture that does not cause stress to the body.

Figure 7:
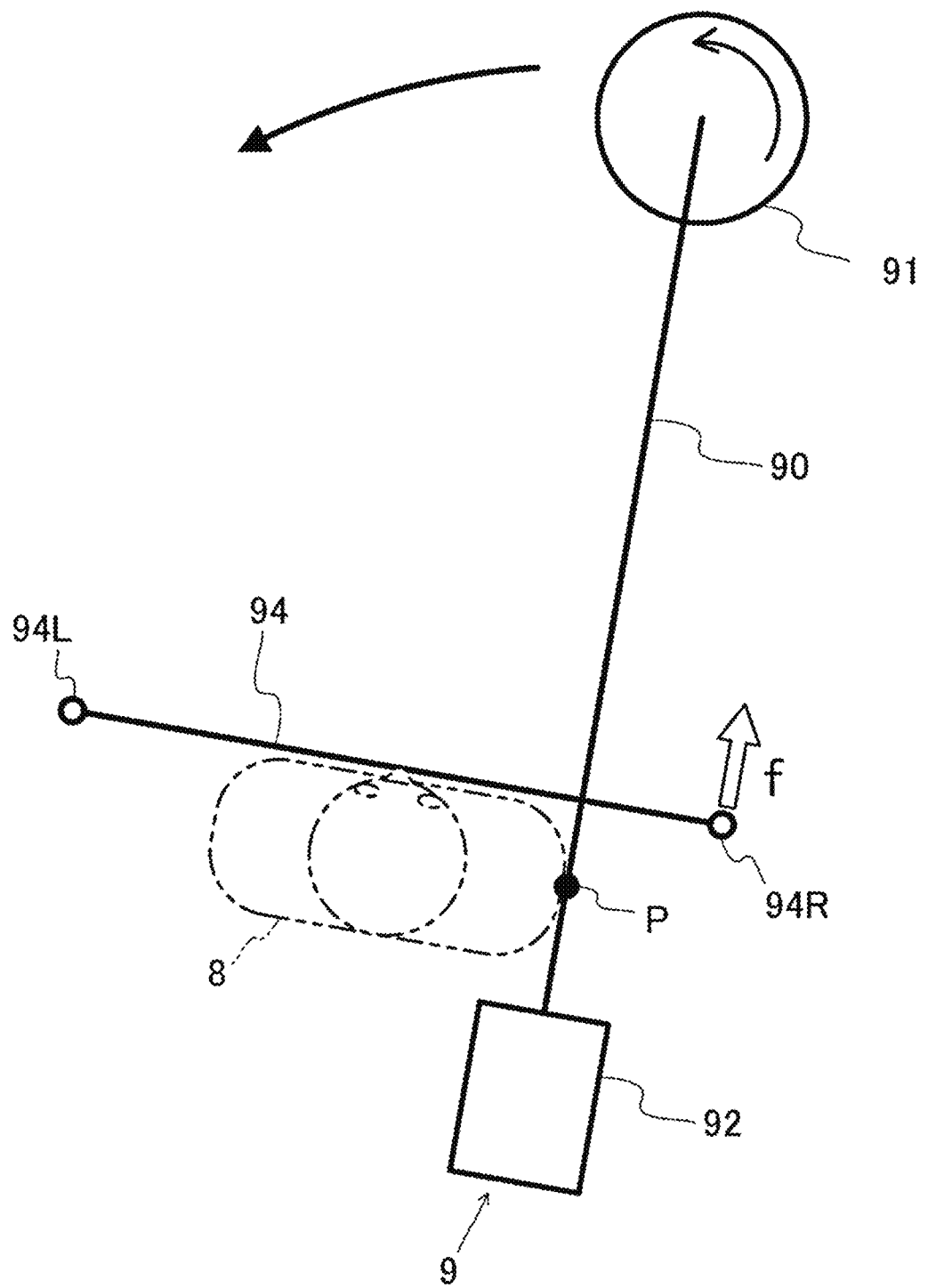
FIG. 7 is a schematic diagram for illustrating the action of a brush cutter handle according to a conventional example.

Referring now to FIG. 7, the usage of a brush cutter 9 according to a conventional example is explained.

Usage of Brush Cutter 9 According to Conventional Example

In a conventional example, to rotate a rotary blade 91 of a brush cutter 9 counterclockwise as seen from a user 8, the brush cutter 9 is suspended on the right side of the user 8 by a known band worn by the user 8. The user 8 performs the mowing work while turning the brush cutter 9 and the handle 94 attached to the shaft 90 of the brush cutter 9 around the suspension position P of the brush cutter 9. Here, the user 8 mows grass and/or the like with the rotary blade 91 in the process of turning the entire brush cutter 9 in an arc from right to left. When the entire brush cutter 9 is turned to the left to a desired position while performing the mowing work, the entire brush cutter 9 is then turned in an arc from left to right. The user 8 turns the entire brush cutter 9 in an arc from right to left and from left to right repeatedly around the suspension position P, and gradually moves forward to perform the mowing work.

In the conventional example, the user 8 turns the entire brush cutter 9 from right to left mainly by the force of pushing the right grip 94R of the handle 94 with the right hand. In particular, the user 8 also uses the force of pulling the left grip 94L with the left hand, pushing the shaft 90 with the lower back, pushing the handle 94 with the leg, or the like. However, in the structure of the handle 94 and brush cutter 9 according to the conventional example, the right hand pushing force is still dominant in turning the entire brush cutter 9 from right to left.

Here, it is assumed that the force to push the right grip 94R with the right hand is f, and the length along the handle 94 from the suspension position P to the right grip 94R is 1. In this way, the magnitude of the moment of force, n, in turning the entire brush cutter 9 from right to left is approximately $n = f \times 1$. In the handle 94 and brush cutter 9 according to the conventional example, the length l cannot be increased due to the structure since the brush cutter 9 is suspended on the right side of the user 8. In particular, when the entire brush cutter 9 is turned from right to left, the recoil works in the opposite direction through the rotary blade 91 since the rotary blade 91 is in the middle of cutting the grass and/or the like. Considering these factors, it is understood that the force to push out the right grip 94R with the right hand needs to be increased. Thus, with the structures of the handle 94 and brush cutter 9 according to the conventional example, the burden on the hand and arm of the user 8 is very large when turning the entire brush cutter 9 from right to left.

When turning the entire brush cutter 9 from left to right, there is less recoil from cutting grass and/or the like with the rotary blade 91 than when turning the entire brush cutter 9 from right to left. However, even in this case, the burden on the hand and arm of the user 8 remains high because the force to push out the left grip 94L of the handle 94 with the left hand is dominant.

Figure 6:
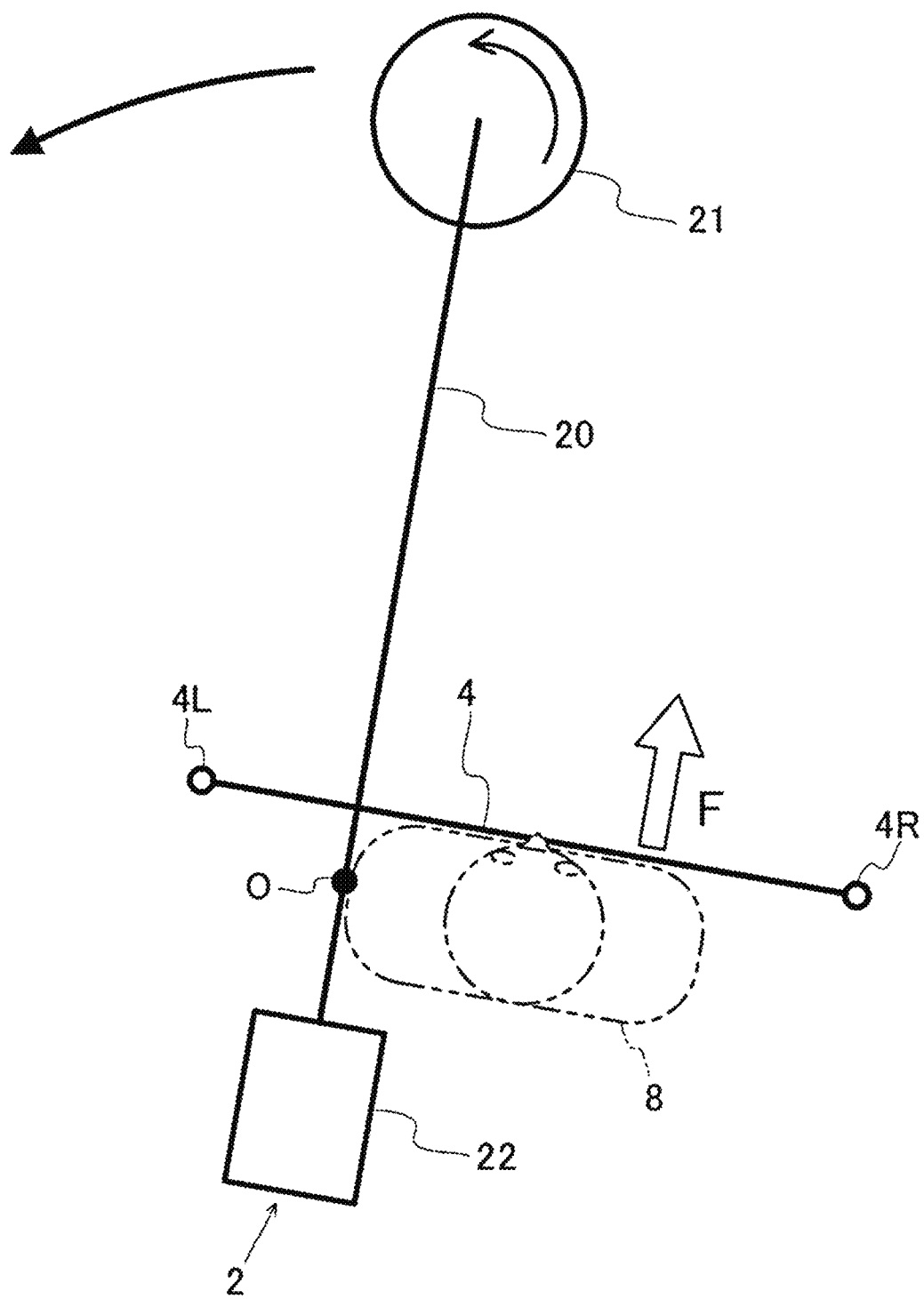
FIG. 6 is a schematic diagram for illustrating the action of the brush cutter handle according to the same embodiment.

Referring now to FIG. 6, the effect of the brush cutter handle 4 according to the present embodiment is described, along with the use, in comparison with the conventional example.

Effect of Brush Cutter Handle 4

In the present embodiment where the rotary blade 21 of the brush cutter 2 rotates counterclockwise as seen from the user 8, the brush cutter 2 is suspended on the left side of the user 8 by the brush cutter band 3 attached to the user 8. The user 8 performs the mowing work while turning the brush cutter 2 and the brush cutter handle 4 in an arc around the suspension position O of the brush cutter 2. Here, the user 8 mows grass and/or the like with the rotary blade 21 in the process of turning the entire brush cutter 2 from right to left. When the entire brush cutter 2 is turned to the left to a desired position while performing the mowing work, the entire brush cutter 2 is then turned in the opposite direction, from left to right. The user 8 turns the entire brush cutter 2 in an arc from right to left and left to right repeatedly around the suspension position O, and gradually moves forward to perform the mowing work.

The user 8 pushes the above-described pressed portion of the brush cutter handle 4 with the knee or thigh of the right leg of the user 8 at the same time as the user 8 takes one step forward with the right leg. As a result, the brush cutter 2 and the brush cutter handle 4 turns from right to left around the suspension position O as the center. In the process of this turning, the rotary blade 21 mows grass and/or the like. At this time, since the right leg of the user 8 is provided with the pad plate 6, force can be effectively applied to the pressed portion of the brush cutter handle 4 through the pad plate 6.

Without the pad plate 6, the bar 40 of the brush cutter handle 4 (the above-described pressed portion) is squeezed into the right leg of the user 8, and thus the force to push out the right leg of the user 8 is dispersed. On the other hand, with the pad plate 6, the bar 40 of the brush cutter handle 4 (the above-described pressed portion) is prevented from squeezing into the right leg of the user 8, the force to push out the right leg can be effectively transmitted to the bar 40 and the burden on the right leg of the user 8 can be reduced.

Conversely, when turning the brush cutter 2 and the brush cutter handle 4 from left to right, the user 8 pushes the above-described pressed portion (specifically, the left portion of the bar 40) of the brush cutter handle 4 with the knee or thigh of the left leg of the user 8 at the same time as the user 8 takes one step forward with the left leg. As a result, the brush cutter 2 and brush cutter handle 4 turns from left to right around the suspension position O.

As described above, according to the brush cutter handle 4, the user 8 can turn the brush cutter 2 and the brush cutter handle 4 from right to left and left to right simply by making a forward movement stepping forward alternately with the right leg and left leg. At this time, the user 8 only needs to lightly hold the right grip 4R and left grip 4L of the brush cutter handle 4 with both hands, and little arm force is required to turn the brush cutter 2 and brush cutter handle 4. In other words, in the present embodiment, the entire brush cutter 2 can be turned from right to left mainly by the force of pushing out the above-described pressed portion of the brush cutter handle 4 with the right leg.

Here, it is assumed that the force to push the brush cutter handle 4 with the right leg is F, and the length along the brush cutter handle 4 from the suspension position O to the position that is pushed by the right leg in the brush cutter handle 4 (specifically, a position that is pushed via the pad plate 6) is L. In this way, the magnitude of the moment of force, N, in turning the entire brush cutter 2 from right to left is approximately $N = F \times L$. In the brush cutter handle 4 and brush cutter 2 according to the present embodiment, the length L can be increased structurally because of the manner in which the brush cutter 2 is suspended on the left side of the user 8. In particular, when the entire brush cutter 2 is turned from right to left, the recoil works in the opposite direction through the rotary blade 21 since the rotary blade 21 is in the middle of cutting the grass and/or the like. However, according to the brush cutter handle 4, the length L can be increased. In addition, securing the force F to push out the right leg is extremely easy compared to securing the force to push out with the right hand. The usefulness of the action and effect of the present embodiment can be easily grasped by comparing FIGS. 6 and 7.

Considering the above, it can be seen that the structure of the handle for the brush cutter 4 of the present embodiment can considerably reduce the burden on the user 8 when turning the entire brush cutter 2 from right to left. In addition, when turning the entire brush cutter 2 from left to right, the user 8 only needs to take one step forward with the left leg, so the burden on the user 8 when turning the entire brush cutter 2 from left to right is very small.

The brush cutter handle 4 configured as described above allows the user 8 to hold the right grip 4R and the left grip 4L in a posture that does not cause stress to the body. The brush cutter handle 4 turns alternately to the left and to the right around the suspension position O when the above-described pressed portion is pushed by the forward movement of the user 8 stepping forward alternately with the right leg and the left leg. Therefore, the user 8 only needs to lightly hold the right grip 4R and the left grip 4L with both hands when turning the brush cutter handle 4 and the brush cutter 2, and only needs to fine-tune the position of the brush cutter handle 4 and the brush cutter 2 mainly through the right grip 4R and the left grip 4L.

Attachment 7

An attachment 7 illustrated in FIGS. 5A and 5B is a member that can be attached to the back surface 21b of the rotary blade 21 as seen from the user 8. The attachment 7 is fixed to the rotor that rotates the rotary blade 21 by means of a fixing member 7a including a bolt, nut, or the like. As a result, the attachment 7 rotates with the rotary blade 21 about the rotation axis 21a of the rotary blade 21. The attachment 7 is used while in contact with the ground during the mowing work. The attachment 7 allows the user 8 to perform the mowing work while maintaining the distance between the rotary blade 21 and the ground, thereby reducing the burden on the user 8.

The attachment 7 has a curved surface 70 that bulges in the direction away from the rotary blade 21 and a side surface 71 that is located between the curved surface 70 and the rotary blade 21. The curved surface 70 and the side surface 71 are configured in the shape of a rotator around the rotation axis 21a (a figure drawn when one rotation is made around the rotation axis 21a). As illustrated in FIG. 5A, the curved surface 70 is a portion that is in contact with the ground.

The side surface 71 is a portion of the attachment 7 that corresponds to the side of the cylinder centered on the rotation axis 21a. The side surface 71 in the present embodiment is perpendicular to the back surface 21b of the rotary blade 21. The side surface 71 is provided with a plurality of protrusions 72 that project along the back surface 21b of the rotary blade 21.

The protrusions 72 according to the present embodiment are a pair projecting in opposite directions to each other along a radial direction centered on the rotation axis 21a. In other words, there are two protrusions 72 in the present embodiment. The two protrusions 72 are generally parallel (including exactly parallel) to the back surface 21b. The shape, length, and size of the protrusions 72 are not limited as long as the protrusions 72 can perform the functions described below. For example, the protrusions 72 can be configured as a cylinder, cone, or the like.

The effect of the attachment 7 of the present embodiment is described below.

Effect of Attachment 7

The brush cutter 9 according to the conventional example described above with reference to FIG. 7 is used suspended from a position close to the right lower back of the user 8. On the other hand, the brush cutter 2 according to the present embodiment is used suspended from a position around the thigh to knee of the left leg of the user 8, as illustrated in FIG. 1. Thus, the brush cutter 2 of the present embodiment is used at a lower position than in the conventional example, so that the angle between the ground and the shaft 20 is smaller than in the conventional example.

When the brush cutter 2 of the present embodiment is used as described above, the rotary blade 21 tilts so that the front end is positioned above the rear end, as illustrated in FIG. 5A. Then, in the process of the attachment 7 rotating together with the rotary blade 21, the rear protrusion 72 (the protrusion 72 closer to the user 8) of the pair of protrusions 72 on the side surface 71 of the attachment 7 becomes closer to the ground and the front protrusion 72 (the protrusion 72 farther from the user 8) becomes away from the ground.

At this time, the rear protrusion 72 hits grass and/or the like, causing a recoil, on the rear protrusion 72, in the opposite direction of the rotary blade 21 rotating in a counterclockwise direction. As a result, through the rear protrusion 72, a force Fr toward the left is exerted on the shaft 20, as illustrated in FIG. 5B. On the other hand, the forward protrusion 72 does not hit grass and/or the like, or the ratio of hitting grass and/or the like, is much smaller than that of the rear protrusion 72. Therefore, the recoil acting on the forward protrusion 72 can be ignored.

As described above, the attachment 7 provided with a pair of protrusions 72 sequentially transmits the force Fr toward the left to the shaft 20 in the process of rotating with the rotary blade 21. In other words, the action of the attachment 7 rotating with the rotary blade 21 causes the brush cutter 2 to naturally move toward the left. This reduces the force required from the user 8 during the mowing work to turn the brush cutter 2 and the brush cutter handle 4 from right to left. Thus, the brush cutter set 1 of the present embodiment can also reduce the burden on the user 8 by the attachment 7.

Note that the present disclosure is not limited by the above embodiment and drawings. Modifications (including deletion of components) may be made as appropriate to the extent that the principle of the present disclosure is not changed.

Variation

Figure 8:
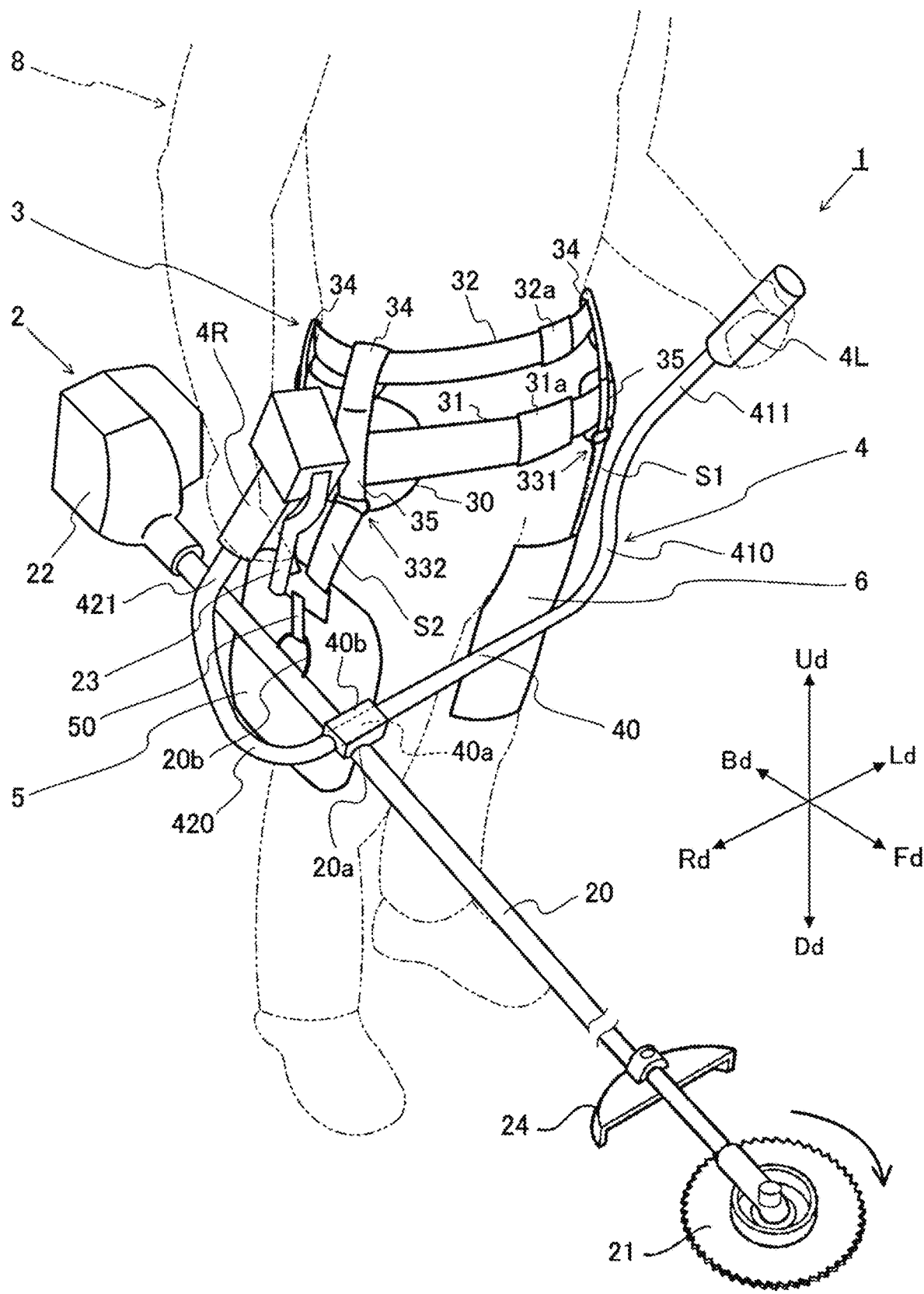
FIG. 8 is a perspective diagram of a brush cutter set according to a variation.

The above embodiment describes an example where the rotary blade 21 of the brush cutter 2 rotates counterclockwise, but the brush cutter set 1 can also be used when the rotary blade 21 rotates clockwise, as illustrated in FIG. 8. In this case, as can be seen in FIG. 8, the brush cutter set 1 is used in a reversed manner of FIG. 1. Specifically, when the rotary blade 21 rotates clockwise, the attached portion 40a of the brush cutter handle 4 is set at a position biased toward the right curve 420 from the center of the bar 40 in the left-right direction. In the brush cutter handle 4, the portion between the attached portion 40a and the left curve 410 of the bar 40 is set as the "pressed portion" to be pressed by the leg of the user 8. The brush cutter handle 4 according to a variation then positions the brush cutter 2 to the right of the user 8.

The method of using the brush cutter set 1 according to the variation can be thought of as the reverse in the left-right relationship from the above embodiment. In other words, the user 8 mows grass and/or the like with the rotary blade 21 in the process of turning the entire brush cutter 2 from left to right. The user 8 performs mowing work by gradually moving forward while repeatedly turning the entire brush cutter 2 in an arc from left to right and from right to left.

In the variation where the rotary blade 21 rotates clockwise, the brush cutter 2 is suspended from the right suspender 332 of the brush cutter band 3. In this variation, the right suspender 332 suspends the brush cutter 2 via the right suspension material S2 and the buffer plate 5. In this variation, the left suspender 331 suspends the pad plate 6. The left suspender 331 suspends the pad plate 6 via the left suspension material S1. The pad plate 6 coupled to the left suspension material S1 is used to be positioned between the front of the left thigh of the user 8 and the brush cutter handle 4, as illustrated in FIG. 8. This allows the pad plate 6 to effectively exert force on the brush cutter handle 4 when the user pushes the brush cutter handle 4 out with the left leg.

As in this variation, when the brush cutter 2 is suspended from the right suspender 332, two sub-belt loops 34 located above the right suspender 332 and corresponding to the right suspender 332 (that is, the sub-belt loop 34 corresponding to the first right anchor 332a and the sub-belt loop 34 corresponding to the second right anchor 332b) serve as the corresponding sub-belt loops. In this case, the main belt loop 35 corresponding to the first right anchor 332a and the main belt loop 35 corresponding to the second right anchor 332b serve as the corresponding main belt loops that are below the corresponding sub-belt loops and corresponding to the corresponding belt loop.

Other Variations

The shape and configuration of the brush cutter band 3 can be changed arbitrarily, as long as the shape and configuration do not interfere with the function. For example, the numbers of sub-belt loops 34, main belt loops 35 and support loops 36 provided on the pelvic pad 30 are not limited to the above example and can be changed arbitrarily. For example, the two sub-belt loops 34 and two main belt loops 35 corresponding to the left suspender 331 can be changed to one sub-belt loop 34 and one main belt loop 35 that are wider than those in the above embodiment. The same applies to the part corresponding to the right suspender 332. The brush cutter 2 may be suspended from the brush cutter band 3 via one left suspension material S1 or one right suspension material S2 that is wider than those in the above embodiment.

The shape and configuration of the brush cutter handle 4 can be changed arbitrarily, as long as the shape and configuration do not interfere with the function. For example, the bar 40 does not necessarily be straight all the way through and may be partially curved. The shape of the brush cutter handle 4 from the bar 40 to each of the left grip 4L and the right grip 4R can be changed arbitrarily, as long as the shape does not interfere with the use described above. An alternative member to the pad plate 6 may be provided directly on the above-described pressed portion of the brush cutter handle 4. The member may be a cushioning material or the like provided on the above-described pressed portion.

The brush cutter band 3 can be used to suspend not only the brush cutter 2 attached with the brush cutter handle 4 as described above, but also the brush cutter 9 attached with the handle 94 according to the conventional example described with reference to FIG. 7. In this case, the brush cutter 9 can be suspended from the right suspender 332 of the brush cutter band 3 via the right suspension material S2.

The brush cutter 2 attached with the brush cutter handle 4 described above may be suspended and used on a band other than the brush cutter band 3 without a shoulder belt. For example, the brush cutter 2 attached with the brush cutter handle 4 may be suspended and used on a conventionally known band for suspending a brush cutter, such as a band with a shoulder belt that can be hung on the shoulder of the user 8.

The shape and configuration of the attachment 7 may be changed arbitrarily, as long as the shape and configuration do not interfere with the function. For example, the side surface 71 of the attachment 7 may be provided with three or more protrusions 72. Preferably, the plurality of protrusions 72 provided on the side surface 71 include a pair of protrusions 72 that project in opposite directions to each other from the viewpoint of assisting the turning operation of the brush cutter 2 by the user 8. The plurality of protrusions 72 may be evenly disposed in a circumferential direction around the rotation axis 21a. However, even if only one protrusion 72 is provided on the side surface 71, the protrusion can assist the turning operation of the brush cutter 2 by the user 8 to some extent. The side surface 71 may not be perpendicular to the back surface 21b of the rotary blade 21, but may be inclined with respect to the back surface 21b.

In the above description, descriptions of known technical matters have been omitted where appropriate to facilitate understanding of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

SUPPLEMENTARY NOTES

The brush cutter set described above can also reduce the burden on the user in terms of the following Supplementary Notes.

Supplementary Note 1

A brush cutter handle used for a brush cutter including a shaft extending in a front-back direction of a user, a rotary blade located at a front end of the shaft, and a prime mover located at a rear end of the shaft to rotate the rotary blade, the brush cutter handle being attached to the shaft, comprising:
 a bar intersecting the shaft and extending in a left-right direction as seen from the user;
 a left curve continuous with a left end of the bar as seen from the user, and curving and extending upward toward the user;
 a left bend continuous with an upper end of the left curve and bending and extending toward a front of the user;
 a right curve continuous with a right end of the bar as seen from the user, and curving and extending upward toward the user; and
 a right bend continuous with an upper end of the right curve, and bending and extending toward the front of the user, wherein
 the left bend is provided with a left grip to be held by the left hand of the user,
 the right bend is provided with a right grip to be held by the right hand of the user, the bar has an attached portion that intersects the shaft and to be attached to the shaft,
 in a first case where the rotary blade of the brush cutter rotates counterclockwise as seen from the user, the attached portion is set at a position biased toward the left curve from the center of the bar in the left-right direction, and a portion of the bar between the attached portion and the right curve is set as a pressed portion to be pressed by the leg of the user,
 in a second case where the rotary blade of the brush cutter rotates clockwise as seen from the user, the attached portion is set at a position biased toward the right curve from the center of the bar in the left-right direction, and a portion of the bar between the attached portion and the left curve is set as a pressed portion to be pressed by the leg of the user,
 in the first case, the brush cutter is positioned to the left of the user, and
 in the second case, the brush cutter is positioned to the right of the user.

Supplementary Note 2

The brush cutter handle according to Supplementary Note 1, wherein
 the left curve extends diagonally upward while curving and extending toward the back of the user, and
 the right curve extends diagonally upward while curving and extending toward the back the user.

Supplementary Note 3

A brush cutter set comprising:
 the brush cutter handle according to Supplementary Note 1 or 2;

the brush cutter; and a brush cutter band to be wrapped around at least one of the pelvic area and lower back of the user to suspend the brush cutter, wherein the brush cutter band can be attached with a suspension material for suspending the brush cutter, the shaft has a hanger that is suspended from the brush cutter band via the suspension material and is positioned between the attached portion and the prime mover, a length of the suspension material is adjustable, and the bar of the brush cutter handle is used so that the bar of the brush cutter handle is positioned on the knee or thigh of the user.

Supplementary Note 4

The brush cutter set according to Supplementary Note 3, comprising:

a cup-shaped attachment attached to the back surface of the rotary blade as seen from the user and configured to rotate with the rotary blade, wherein the attachment has a curved surface that bulges away from the rotary blade and a side surface positioned between the curved surface and the rotary blade, and the side surface is provided with a protrusion that projects along the back surface of the rotary blade.

Supplementary Note 5

The brush cutter set according to Supplementary Note 4, wherein there is a plurality of the protrusions that includes a pair of protrusions that project in opposite directions to each other.

The present application is based on Japanese Patent Application No. 2022-014259, filed on Feb. 1, 2022, the entire disclosure of which is incorporated by reference herein.

REFERENCE SIGNS LIST

1 Brush cutter set
2 Brush cutter
O Suspension position
Shaft
20a Handle attachment position
20b Hanger
21 Rotary blade
21a Rotation axis
21b Back surface
22 Prime mover
23 Throttle
24 Scattering protection cover
3 Brush cutter band
30 Pelvic pad
Fb Load
Ft Tightening force
Fs Tension
31 Main belt
31a Clasp
32 Sub-belt
32a Clasp
33 Suspender
331 Left suspender
331a First left anchor
331b Second left anchor
S1 Left suspension material
332 Right suspender
332a First right anchor
332b Second right anchor
S2 Right suspension material
34 Sub-belt loop
35 Main belt loop
36 Support loop
4 Brush cutter handle
40 Bar
40a Attached portion
40b Coupling material
410 Left curve
411 Left bend
4L Left grip
420 Right curve
421 Right bend
4R Right grip
5 Buffer plate
50 Latch
6 Pad plate
7 Attachment
7a Fixing member
70 Curved surface
71 Side surface
72 Protrusion
8 User
9 Brush cutter according to conventional example
P Suspension position
90 Shaft
91 Rotary blade
94 Handle
94L Left grip
94R Right grip

The invention claimed is:

1. A brush cutter band to be worn by a user of a brush cutter and used to suspend the brush cutter, the brush cutter band comprising:

a pelvic pad to be wrapped around a pelvic area of the user;

a main belt to be wrapped around the pelvic pad and tightened over the pelvic area through the pelvic pad;

a sub-belt to be fastened around a lower back of the user;

a plurality of sub-belt loops provided on the pelvic pad and to be threaded with the sub-belt; and a suspender provided on the pelvic pad and suspendable of the brush cutter, wherein the pelvic pad is suspended from the sub-belt by the plurality of sub-belt loops, the plurality of sub-belt loops includes a corresponding sub-belt loop located above and corresponding to the suspender, the suspender includes a left suspender to be located on a left leg of the user in a worn state where the brush cutter band is worn by the user and a right suspender to be located on a right leg of the user in the worn state, in a case where the brush cutter is suspended from one of the left suspender and the right suspender, the other can be used to suspend a pad plate to be applied to at least one of a knee and a thigh of the user, the left suspender includes a first left anchor and a second left anchor that are spaced from each other in a longitudinal direction of the pelvic pad and capable of tethering a suspension material, the first left anchor is located more forward for the user than the second left anchor in the worn state, the right suspender includes a first right anchor and a second right anchor that are spaced from each other in a longitudinal direction of the pelvic pad and capable of tethering a suspension material, the first right anchor is located more forward for the user than the second right anchor in the worn state, in a case where the brush cutter is suspended from the left suspender and the pad plate is suspended from the right suspender, the left suspender suspends the brush cutter via the suspension material tethered to the first left anchor and the second left anchor, and the right suspender suspends the pad plate via the suspension material tethered to the first right anchor, and in a case where the brush cutter is suspended from the right suspender and the pad plate is suspended from the left suspender, the right suspender suspends the brush cutter via the suspension material tethered to the first right anchor and the second right anchor, and the left suspender suspends the pad plate via the suspension material tethered to the first left anchor.

2. The brush cutter band according to claim 1, wherein there are at least four of the corresponding sub-belt loop, corresponding to each of the first left anchor, the second left anchor, the first right anchor, and the second right anchor.

3. The brush cutter band according to claim 1, wherein the pelvic pad further comprises a plurality of main belt loops provided on the pelvic pad and threaded with the main belt, and the plurality of main belt loops includes a corresponding main belt loop located below and corresponding to the corresponding sub-belt loop.

4. A brush cutter set comprising:

a brush cutter band to be worn by a user of a brush cutter and used to suspend the brush cutter;

the brush cutter; and a brush cutter handle to be attached to the brush cutter, wherein the brush cutter band comprises a pelvic pad to be wrapped around a pelvic area of the user;

a main belt to be wrapped around the pelvic pad and tightened over the pelvic area through the pelvic pad;

a sub-belt to be fastened around a lower back of the user;

a plurality of sub-belt loops provided on the pelvic pad and to be threaded with the sub-belt; and a suspender provided on the pelvic pad and suspendable of the brush cutter, wherein the pelvic pad is suspended from the sub-belt by the plurality of sub-belt loops, and the plurality of sub-belt loops includes a corresponding sub-belt loop located above and corresponding to the suspender, the brush cutter comprises a shaft extending in a front-back direction of the user, a rotary blade located at a front end of the shaft, and a prime mover located at a rear end of the shaft and configured to rotate the rotary blade, the brush cutter handle comprises a bar intersecting the shaft and extending in a left-right direction as seen from the user, a left grip located on a left side of the bar as seen from the user and to be held by a left hand of the user, and a right grip located on a right side of the bar as seen from the user and to be held by a right hand of the user, the bar has an attached portion intersecting the shaft and to be attached to the shaft, in a first case where the rotary blade of the brush cutter rotates counterclockwise as seen from the user, the attached portion is set at a position biased to the left as seen from the user from a center of the bar in the left-right direction, and a portion of the bar to the right as seen from the user from the attached portion is set as a pressed portion to be pressed by a leg of the user, in a second case where the rotary blade of the brush cutter rotates clockwise as seen from the user, the attached portion is set at a position biased to the right as seen from the user from the center of the bar in the left-right direction, and a portion of the bar to the left as seen from the user from the attached portion is set as a pressed portion to be pressed by a leg of the user, and the brush cutter handle positions the brush cutter to the left of the user in the first case and positions the brush cutter to the right of the user in the second case.

* * * * *